(No Model.)
I. WANTLING & J. T. JOHNSON.
COAL CUTTING MACHINE.
No. 475,833. Patented May 31, 1892.
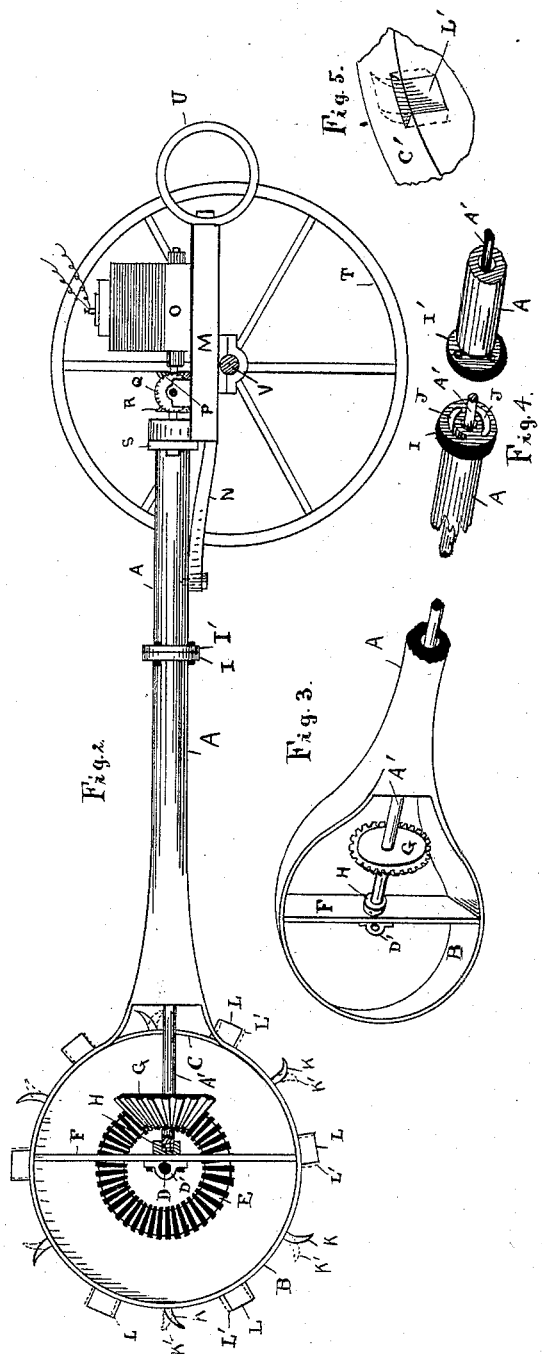
Witnesses.
R. N. McCormick
A. Keithley
Inventor
Isaac Wantling
James T. Johnson
By Wreft Atty.

UNITED STATES PATENT OFFICE.

ISAAC WANTLING AND JAMES T. JOHNSON, OF PEORIA, ILLINOIS.

COAL-CUTTING MACHINE.

SPECIFICATION forming part of Letters Patent No. 475,833, dated May 31, 1892.

Application filed November 25, 1891. Serial No. 413,113. (No model.)

*To all whom it may concern:*

Be it known that we, ISAAC WANTLING and JAMES T. JOHNSON, citizens of the United States, residing at Peoria, in the county of Peoria and State of Illinois, have invented certain new and useful Improvements in Coal-Cutting Machines; and we do hereby declare that the following is a full, clear, and exact description of the invention, which will enable others skilled in the art to which it appertains to make and use the same.

Our invention relates to certain new and useful improvements in coal-cutting machines, by means of which a machine is provided being simple in construction, durable, and effective in operation, for the purposes designed.

More particularly our invention relates to that class of cutting-machines provided with rotary cutting-wheels having cutting-tools adjusted thereon, the said wheels being designed to be rotated very rapidly.

Our invention consists, essentially, of the adjustment and formation of two wheels adapted to be rotated in opposite directions, and provided with suitable gear formation within the said wheels, and suitable gear connection for operating the said wheels in opposite directions, and with the said wheels provided with suitable cutting-tools, all of which matters of form and detail structure will be explained more fully hereinafter.

That our invention may be more fully understood, reference is had to the accompanying drawings, in which—

Figure 1 is a plan view of our invention, showing the same connected with a mounted power. Fig. 2 is a side view thereof in section, showing the same mounted connection with the power for operation of the same. Fig. 3 is a detailed view of a frame structure designed to be carried between the wheels. Fig. 4 is a detailed view showing the manner of connection between sections of tubing or pipe. Fig. 5 is a detailed view showing the adjustment of a cutting-tool within the periphery of the wheels in the figures.

A is a tube cored out to provide for the carrying of the shaft A', the said tube A being formed at its forward end into the loop or frame-work B, as shown in Fig. 3, provided at its central portion with the perpendicular frame-piece F, and upon the central portion of the frame-piece F is adjusted the clamp or box D', purposed to carry the axle D, the said axle being secured firmly within the box so as to be rigid that it may not turn.

C C' are wheels journaled upon the axle D, the axles being so turned as to provide for the adjustment of the wheels C C' obliquely with reference to the tube A and at an angle with each other, the frame-work or periphery B being formed to completely fill the space between the said wheels and to conform with and be in perfect alignment with the peripheries of the said wheels. The wheels C C' are provided with the internal spur gear-wheels E E', the same being cut from out the solid wheel, therefore being integral therewith and with the apex of the respective miter gear-wheels, bearing inward to the inner edges of the respective wheels C C'.

K K K K are cutting-tools set in or fixed upon the surfaces of the respective wheels C C' and formed to bear forward in the direction of rotation of the respective wheels, they therefore being adjusted at opposites with one another—that is, upon the different wheels.

L L L L' L' L', &c., are cutting-tools set in the outer faces of the wheels C C' and designed to be curved outward and bear slightly above the cutting-tools K K, &c., for the purpose of cutting and trimming the surfaces of the body being cut. The shaft A', journaled within the tube A, bearing forward, is secured at its extreme forward end in the socket H by means of a small pin being carried through and bearing within a groove cut in the circumference of the said shaft at its forward extremity, thus enabling it to turn freely within the said socket H, but preventing it from being withdrawn therefrom by means of the pin and groove. Upon the shaft A' is carried the miter gear-wheel G and so adjusted as to mesh with the respective miter gear-wheels E E', and is keyed securely upon the shaft in such position.

The tube A is made in section connected by means of the rims I I', being bolted together to accommodate the adjustment of the cutting-wheels in a vertical or horizontal position, as desired, and to facilitate this adjustment the slots J J are provided in the rim I, through which the bolts bear, which provides for a ready turning of the tube without a complete detachment of the bolts; but the sections may be clamped or secured in any suitable manner, and any expedient may be adopted to facilitate adjustment at the extremity of the tube A. There is shown in the drawings a connection with a carriage upon which is mounted a motor designed to show the application of power to provide for the operation of the device.

The carriage consists, essentially, of the frame-work M, mounted upon the wheels T T and provided with the forward brace N and also the hand-holds U, V being the axle provided for the wheel. O represents the motor bearing upon its shaft the spur-wheel P, which meshes with the intermediate spur-wheel Q, which in turn meshes with the spur-wheel R, the same being keyed upon the shaft A', thus completing the connection between the device and the operating means, it being supposed, of course, that the motor has the proper connection with the dynamo, that has sufficient capacity to operate the machine.

The cutting-wheels are adjusted obliquely with the shaft to provide width at base of cutting-head thus formed for insertion of pinion G, and narrows at the forward part to bring the cutting-tools nearer together to cut out the middle. The cutting-tools L L' are provided and bent outward from the faces of the cutting-wheels, so that as the cutting-head bears forward in the body of coal they will clear the sides, cutting it away gradually as it moves forward.

In operation as in coal-mining, the adjustment of the various parts being made as herein shown or in such other adjustments as to bear out the principle herein involved, power being applied through and by means of a motor, an engine, or any power desired to be used. The shaft A' is caused to be rotated, in which rotation a corresponding rotary motion is conveyed to the miter gear-wheel G. The same, meshing with the miter gear-wheels E E', conveys a rotary motion to the said miter gear-wheels and to the wheels C C', said wheels rotating in opposite direction and being rapidly rotated and being provided with the cutting-tools, as shown, and borne forward against a body designed to be penetrated—as, for instance, a body of coal—the coal will be quickly cut away, and it can be run into the body of coal a considerable distance. In the adjustment here shown a perpendicular cut will be made, it being designed to be borne forward by pressure, which may be applied from the hand-holds U U, and the frame-work is so adjusted upon the axle V that the machine may be tilted upward or downward, as desired, it being designed in operation that a long perpendicular cut be made by the playing up and down within a long cut, thus cutting it out gradually. A horizontal cut may be made by merely adjusting the cutting device or the wheels at right angles with the position here shown, the operation and mode of applying power being identical with that herein shown.

The advantages possessed by the use of this device are numerous. Chief among them is its simple adaptation for the purpose designed and the adaptability of the device to accommodate itself to any degree or kind of power that may be desired to be used. In the operation of coal-mining the opposite rotation of the wheels equalizes the draft and reduces it to the minimum, thus gaining a great advantage over cutting-wheels rotated in the same direction, which are always accompanied with an immense draft, which hinders greatly the successful operation of such machines.

The various parts of the device herein shown may be varied in form or adjustment to suit the application in which they may be desired to be used, retaining always the principle herein involved.

Having thus fully described our invention, what we claim, and desire to secure by Letters Patent, is—

1. The combination, in a coal-mining machine, of the cutting-wheels C C', provided with the cutting-tools K K, L L, L' L', &c., upon their outer surfaces and with the internal miter gear-wheels E E' and journaled upon the axle D, with the miter gear-wheel G, meshing with the miter gear-wheels E E' and carried upon the shaft A', the frame-work B, provided with the perpendicular frame-piece F, which supports the axle D by means of the box D' and the end of the shaft A' by means of the socket H, the tube A, which incloses and provides a journal-bearing for the shaft A', and the rims I I', which unite the sections of the two, all connected with any suitable power, all substantially as described and set forth.

2. The combination, in a coal-cutting machine, of the obliquely-adjusted cutting-wheels C C', provided with the cutting-tools K L and the internal gear or cogs E E', with the frame-work B, having the extension-tube A integral therewith, and the shaft A', journaled in the cross-piece F of the frame-work B and in the tube A, and having keyed thereon the pinion-wheel G, adjusted to mesh with the gear-cogs E E' on the cutting-wheels C C' to rotate them in opposite directions, all substantially as described and set forth.

3. In a coal-cutting machine, the combination, with the shaft D, carried in the cross-piece F and angled at its extremities, of the cutting-wheels C C' to give the wedge shape to the cutting-head by the wheels being carried upon the angles of the shaft, the pinion G, carried upon the shaft A' and meshing with the cogs of the gear E E' to rotate the
5 wheels in opposite directions, and the framework B, provided with the tube-extension A, all substantially as described and set forth.

In testimony whereof we affix our signatures in presence of two witnesses.

ISAAC WANTLING.
    JAMES T. JOHNSON.

Witnesses:
 JOSIE TEFFT,
 R. N. MCCORMICK.

It is hereby certified that in Letters Patent No. 475,833, granted May 31, 1892, upon the application of Isaac Wantling and James T. Johnson, of Peoria, Illinois, for an improvement in "Coal-Cutting Machines," an error appears in the printed specification requiring correction, as follows: In lines 1-2, page 3, the words "work B, provided with the tube extension A, all substantially as described and set forth," should be stricken out and inserted after line 7 as now numbered, same page; and that the Letters Patent should be read with this correction therein that the same may conform to the record of the case in the Patent Office.

Signed, countersigned, and sealed this 14th day of June, A. D. 1892.

[SEAL.]

CYRUS BUSSEY,
*Assistant Secretary of the Interior.*

Countersigned:
    W. E. SIMONDS,
        *Commissioner of Patents.*